Figure 1:
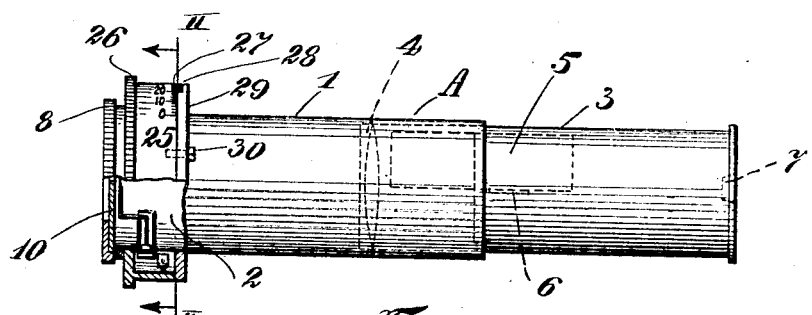

Feb. 17, 1925.

I. I. RABI

SPECTROSCOPE

Filed May 22, 1920

1,526,504

Inventor
I. I. Rabi
By his Attorney

Patented Feb. 17, 1925.

1,526,504

UNITED STATES PATENT OFFICE.

ISIDOR ISAAC RABI, OF BROOKLYN, NEW YORK.

SPECTROSCOPE.

Application filed May 22, 1920. Serial No. 383,371.

*To all whom it may concern:*

Be it known that I, ISIDOR ISAAC RABI, a citizen of the United States, and a resident of the borough of Brooklyn, county of Kings, and State of New York, have invented certain new and useful Improvements in Spectroscopes, set forth in the following specification.

This invention relates in one of its broad aspects to all optical instruments of the type in which an optical image is to be studied quantitatively, and in this aspect this object is to provide a readily adjustable position-measured indicator for cooperation with the image developed by the instrument. In another of its broad aspects, the invention relates to an optical instrument which develops an optical image against a dark field and in this aspect has for its purpose the provision of a self luminous indicator to be visible in said dark field in cooperation with said image.

More particularly, it is an object of the invention to render the measured analysis of an exteriorly illuminated object more accurate, specifically in its adaptation to the spectroscope. A part of the objective is a dark field and another part is an exteriorly illuminated developed spectrum. A measuring pointer for analyzing the spectrum is provided. The pointer, to be accurate, must have considerable body and must come to a sharp point; but for the human eye to cause the pointer to cooperate in the measurement of the spectrum, the whole pointer must be visible. If the whole pointer overlies the spectrum to be analyzed, too large a part of the spectrum is obscured by the pointer. If only the tip of the pointer overlies the spectrum, accurate adjustments cannot be made because the bulk of the pointer is invisible in the dark field. According to the present invention, means, preferably in the form of a radio-active coating is applied to the pointer so that the portion of the pointer in the dark field is visible to the human eye and also the tip of the pointer overlying the spectrum is visible by being dark relatively thereto. Cooperation between the two kinds of illumination, the self-luminous illumination for the part of the pointer in the dark field and the contrast of the pointer with the light spectrum, is effected so that the human eye can accurately carry the contour of the pointer down to its true point and make proper adjustment in the spectrum analysis.

Further objects of the invention are to improve in general, mechanism for measurably manipulating an interior indicating device in an optical instrument. The above and further objects will better be understood by reference to the illustrative embodiments to which the following claims are directed merely for purposes of illustration and which are described in the following specification in connection with the accompanying drawings which form a part hereof.

Figures 2, 5, 6:
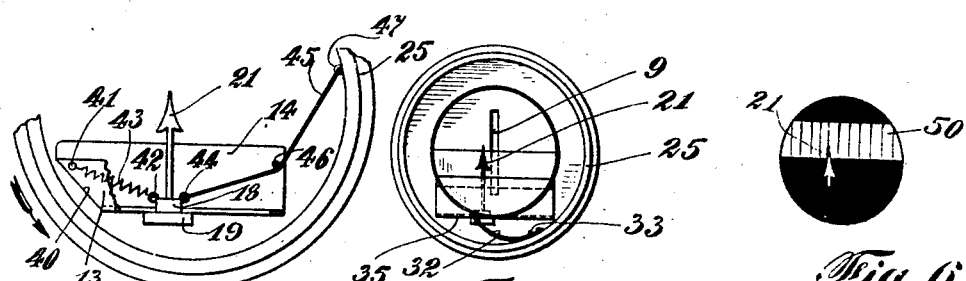
Figure 3:
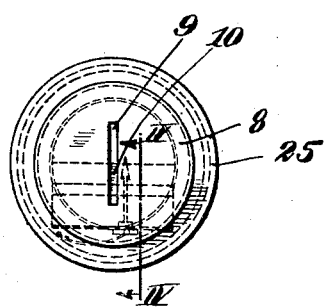
Figure 4:
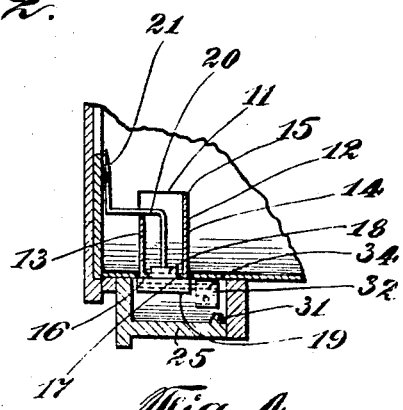

In the drawings, Fig. 1 is a side elevation of a spectroscope embodying the invention, with parts broken away and parts shown in vertical section; Fig. 2 is a section taken along line II—II of Fig. 1 with parts shown in elevation; Fig. 3 is an elevation looking towards the right of Fig. 1; Fig. 4 is an enlarged sectional view taken along line IV—IV of Fig. 3; Fig. 5 is a view corresponding to Fig. 2 but showing a modification of the connection between the measuring sleeve and the indicator; and Fig. 6 is a diagram showing an eye-view through the instrument.

A spectroscope A has been selected to illustrate an embodiment of the invention, not because the invention is limited to spectroscopes, but because the spectroscope is one of the best examples of its application.

1 indicates a collimating tube of any convenient construction which provides the dark enclosure 2 in its interior and into which telescopes adjustably the lens and prism carrying tube 3 of any satisfactory construction. As illustrated the usual collimating lens 4 is provided in the end of the tube and a prism 5 in front of the lens 4 is positioned preferably to occupy only the upper half of the tube, in which position it may be supported by a diametric partition 6. In the construction illustrated, the eyepiece 7 provides merely an aperture for vision and is not of the lens type.

The usual cap 8 may close the objective end of the collimating tube 1 and, if provided with a long objective slot 9, it is preferred to block off the lower half of this slot by inserting a semi-circular blank 10 which readily converts an old style spectroscope into one best adapted to embody my invention. Obviously of course, the objective slot 9 may be so constructed in the cap 8 as to terminate at the position blocked off by the blank 10, in which event there is no need to employ the blank 10.

Near the objective end of the tube 1, a slot 11 is cut out to receive the pointer guide frame 12 which may be secured in position in any suitable manner as by soldering directly to the tube.

The frame 12 may conveniently be formed of sheet-metal, such as sheet brass, and is a trough-like structure having one vertical wall 13 and a second parallel vertical wall 14 preferably somewhat taller than the wall 13 and terminating in the straight edge 15. The bottom wall 16 of the guide-frame 12 is provided with a longitudinal slot 17, through which the rectangular boss 18 of the rectangular guide-sled 19 upwardly projects. The boss 18 mounts the rearwardly offset arm 20 which terminates in the pointer 21. This pointer illustrates generically any indicating device and might of course be a scale. For another example, in the embodiment illustrated, all of the pointer 21 above the wall 15 is rendered self luminous as by painting it with luminous paint or radio-active paint, in fact by treating it in any way chemically, so that it is self luminous. For example, it may be coated with calcium-sulphide paint, lead sulphide paint or better zinc sulphide paint.

Slipped over the objective end of the collimating tube 1 and adapted to have a limited rotation thereon, is a sleeve 25 finger-operated by the knurled flange 26. This sleeve is provided with a scale 27 co-operating with the micrometer scale 28 formed on the flange 29, suitably fixed to the collimating tube 1. A stop-pin 30 projecting inwardly from the flange 29 cooperates with suitable detents 31 to limit the operative rotation of the sleeve 25 in both directions.

A spring 32 is secured as by screws or rivets 33 to the inner wall of the sleeve 25. The movable end of the spring 32 mounts a bearing pin 34 which may turn in the curled end of the spring 32 and itself is secured transversely in the carriage block 19 so that the spring 32 tends to hold the block 19 against the runway 35 and upon rotation of the sleeve 25, in either direction, imparts a corresponding transverse movement to the carriage block 19 and the pointer 21 operated thereby.

It is to be understood that the spring 32 which serves as an operative connection between the sleeve 25 and the indicator 21 is merely illustrative of a preferred connecting means. Any suitable connecting means, however, is contemplated. For example, in Fig. 5, the walls 13 and 14 have extensions 40 to the left to mount an anchor pin 41. Between the anchor pin 41 and a hook 42 on block 18, is connected a tension spring 43 tending to move the pointer 21 to the left. Connected to a similar hook 44 is a flexible tension link 45 passing over the anti-friction device 46 to an anchorage 47 on the inner face of sleeve 25. Any movement of sleeve 25, in the direction of the arrow, causes link 45 to draw pointer 21 to the right. The reverse motion of sleeve 25 permits the spring to move the pointer 21 to the left.

The limiting of the prism 5 to the upper half of the tube 3 prevents a distortion of the image in the indicator 21 seen through the eye-piece 7. Fig. 6 indicates the developed spectrum 50 as viewed through the eye-piece 7 and shows how clearly the pointer 21 shows up in connection with the spectrum 50 to pick out any individual line thereon.

If it should be desired to employ a construction of the type described, having a lens eye-piece, the luminous pointer should be located at the focus of the collimating and prism means, rather than as indicated in Fig. 1, otherwise the construction may be the same.

In the event that it is desired to adapt an old style spectroscope to an embodiment of the present invention, it should be borne in mind that most old style spectroscopes which employ prisms indicate the entire cross section of the tube 3. In such an event, the prism may be cut longitudinally in half and a part substantially like that indicated by 5 employed or if desired otherwise, a rectifying prism, over the bottom half of the cross section of the tube 3, may be mounted at the end of the ordinary prism, to the end that the image of the indicator 21 may be viewed at the eye-piece 27 undistorted.

Although I have described in detail a particular kind of indicator and particular mechanism for moving it in an optical instrument, I have not done so for purposes of limitation but merely for illustration and I desire it to be understood that I believe it to be broadly new to combine a self luminous indicator to be visible against a dark field in combination with an optically developed image.

What I claim and desire to secure by United States Letters Patent is:

1. In a spectroscope, optical means for developing a spectrum visible against a dark field; an adjustable indicator located in said dark field and adapted to co-operate with said spectrum in the analysis of said spectrum, said indicator having a self luminous coating to render it visible in said dark field.

2. In a spectroscope having a dark field, optical means for developing an externally lighted spectrum visible against said dark field; an adjustable indicator movably located largely in said dark field and adapted to cooperate with said spectrum in its analysis; and means wholly within said spectroscope for illuminating said indicator to render the same visible against said dark field.

3. In a spectroscope having a dark field, optical means for developing an externally lighted spectrum visible against said dark field; an adjustable indicator mounted to move for its major part in said dark field and a small portion thereof in said visible spectrum and adapted to cooperate with said spectrum in its analysis; and means wholly within said spectroscope for illuminating the portion of said indicator which is located in said dark field to be visible against said dark field while the portion of said indicator located in said spectrum is relatively dark to be visible against said spectrum.

4. In an optical instrument, an enclosure providing a dark field; optical means associated with said enclosure for producing a light field from illumination exteriorly to said enclosure; an indicator in said dark field, a portion of which overlaps into said said light field; and means wholly within said enclosure for illuminating the portion of said indicator within said dark field to render the same visible against said dark field and leaving the overlapping portion of said indicator dark relatively to said light field so that said indicator as a unit is completely visible contemporaneously against both said light and dark fields.

5. In an optical instrument, an enclosure providing a dark field; optical means associated with said enclosure for producing a light field from illumination exteriorly to said enclosure; an indicator in said dark field, a portion of which overlaps into said light field; means wholly within said enclosure for illuminating the portion of said indicator within said dark field to render the same visible against said dark field and leaving the overlapping portion of said indicator dark relatively to said light field so that said indicator as a unit is completely visible contemporaneously against both said light and dark fields; and a scale measuring operator mounted on said enclosure and operative exteriorly thereof for manipulating the position of said indicator and measuring its position.

6. In an optical instrument, an enclosure providing a dark field; optical means for developing a light field including an image wholly from external illumination against said dark field; and a self-luminous indicator adjustably movable in said dark field along the edge of said light field and means for reading the adjusted position of said indicator.

7. In a spectroscope, a collimating tube mounting optical means and providing an observation slot to develop a visible spectrum; a self-luminous indicator adjustable relatively to said developed spectrum for aiding in spectrum analysis; and a scaled measuring operator mounted on said tube for adjusting said indicator and measuring its position.

8. A spectroscope comprising a collimating tube providing an objective slot; a pointer within said tube; guiding means for guiding said pointer across the objective field of said slot; a sleeve rotatably mounted on said tube and provided with an indicating scale; and an operative connection between said sleeve and said pointer for moving said pointer upon the rotation of said sleeve whereby the position of said pointer within said tube is indicated by the scale on said sleeve.

ISIDOR ISAAC RABI.